United States Patent [19]

Robert

[11] Patent Number: 4,887,228

[45] Date of Patent: Dec. 12, 1989

[54] METHOD FOR FILLING SURFACE PARTS OF AN IMAGE WITH A SURFACE PATTERN

[75] Inventor: Rob W. Robert, Venray, Netherlands

[73] Assignee: Oce-Nederland B.V., Venlo, Netherlands

[21] Appl. No.: 59,048

[22] Filed: Jun. 8, 1987

[30] Foreign Application Priority Data

Jun. 9, 1986 [NL] Netherlands ........................ 8601488

[51] Int. Cl.$^4$ ............................................ G06F 15/66
[52] U.S. Cl. ................................... 364/521; 364/518; 340/747
[58] Field of Search ................ 364/518, 521; 340/701, 340/747

[56] References Cited

U.S. PATENT DOCUMENTS

| | | | |
|---|---|---|---|
| 4,225,861 | 9/1980 | Langdon, Jr. et al. | 340/701 X |
| 4,481,594 | 11/1984 | Staggs et al. | 364/521 |
| 4,615,013 | 9/1986 | Yan et al. | 364/521 |
| 4,667,573 | 6/1987 | Brown et al. | 364/521 |
| 4,682,297 | 7/1987 | Iwami | 364/521 |
| 4,692,880 | 9/1987 | Merz et al. | 364/521 |
| 4,695,966 | 9/1987 | Takakura et al. | 364/521 |
| 4,725,831 | 2/1988 | Coleman | 340/747 |

*Primary Examiner*—Emanuel S. Kemeny
*Assistant Examiner*—Mark K. Zimmerman
*Attorney, Agent, or Firm*—Reed Smith Shaw & McClay

[57] ABSTRACT

The surface parts of an image which is stored in the form of a bit-representation in a raster image memory may be filled with a surface pattern using the following steps: generating a bit-representation of the surface pattern defined uniformly over the entire image surface; generating a mask function, which gives a specific logic value to those raster points which are situated within the boundaries of the surface parts; generating a filling pattern by performing a logic operation on the bit-representation of the surface pattern and the mask function; and transferring the filling pattern to the raster image memory.

11 Claims, 7 Drawing Sheets

METHOD FOR FILLING SURFACE PARTS OF AN IMAGE WITH A SURFACE PATTERN

FIELD OF THE INVENTION

The present invention relates to a method for filling surface parts of an image with a surface pattern when the image is stored in the form of a bit-representation in a raster image memory.

BACKGROUND OF THE INVENTION

Methods for filling surface parts of an image with a surface pattern using a raster image memory are well known. They can be used, for example, in an electronic printing system for printing a page of text, a page of pictures, or a page having a combination of text and pictures in response to the user's instructions. The information to be printed can be input by means of a data-processing system through the associated peripherals. It can then be transmitted to a raster output printer by means of a front-end system containing a raster image memory. The raster output printer, such as a laser printer, is used to print, line by line, the data called serially from the raster image memory.

The data relating to a complete page which is to be printed can be stored in the raster image memory. The page is divided up into a large number of raster points or pixels which are present in the form of a matrix. Typically, there is a 1:1 ratio between the raster points and the 1-bit memory places of the raster image memory. Therefore, the raster image memory is also known as a bit map. The memory places of the raster image memory are frequently combined into multi-bit words such as 16-bit words. In such a case the memory is termed a word-oriented bit-map memory.

U.S. Pat. No. 4,300,206 describes a raster image printer in which data of any size and orientation can be printed on a page. A microprocessor receives a succession of coded character and control data. The coded character data are processed by the microprocessor one-at-a-time in accordance with the control data and translated into character bit-map data and after that the microprocessor positions these data of character bit map into a strip buffer. However, because the described system operates in a sequential manner, it is a relatively slow system.

Applicants' Netherlands patent application No. 8503461 filed on Dec. 17, 1985, and the corresponding U.S. application Ser. No. 943,255, describe a high speed method for generating line parts for a raster output scanner which can be used to print both text information and graphic information. The characters or fonts required for the text information are stored in the form of small bit-maps and can be transferred with appropriate instructions to the required places in the bit-map memory and in the required size for the page to be printed.

Specific programs have been created by others for inputting graphic information. These known programs enable graphic elements to be generated such as straight lines, portions of arcs of a circle and the like. At the user's discretion, these various graphic elements and symbols can be combined in various ways by combining the bit-representations of the graphic elements in the bit-map memory by means of suitable logic operations. The contents of the raster image memory are displayed on a screen so that the user can vary the layout of the page to be printed as necessary.

The following references are of general interest. European Patent Application 0174809 discloses a method and apparatus for filling predetermined areas of a graphics display with a predetermined repetitive pattern by using the undisplayed portion of the frame buffer memory to store the replicated patterns. European Patent Application 0158902 discloses a method of transforming color images into monochromatic images.

Often, it is necessary to stress certain surface parts of the image to be printed. This is done optically by filling those parts with a suitable surface pattern such as cross-hatching, dots or lines so as to draw attention to that surface part. When it is necessary to use the same surface pattern for filling a number of surface parts which directly adjoin or overlap one another, special care must be taken to ensure that the surface pattern does not shift at the boundary between the two surface parts or appear double in the overlap zone of the surface parts.

Accordingly, it is an object of the present invention to provide an efficient method for filling surface parts of an image with a surface pattern wherein adjoining or overlapping surface parts have a continuous pattern.

SUMMARY OF THE INVENTION

Generally, the present invention provides a method for filling surface parts of an image with a surface pattern when the image is stored in the form of a bit-representation in a raster image memory comprising the steps of: (a) generating a bit-representation of a surface pattern defined uniformly over the entire image surface; (b) generating a mask function which produces a first logic value for those raster points which are situated within the boundaries of the surface part and a second logic value for those raster points which are situated outside the boundaries; (c) generating a filling pattern by performing a logic operation which combines the bit-representation of the surface pattern and the mask function; and (d) transferring the filling pattern to the raster image memory.

The method of the present invention allows the user a great variety and ease of performance. It also requires much less time for the computing operations than currently used methods. This is partly due to minimizing the number of accesses to memory which are made. It also ensures that the surface pattern does not shift at the boundary between two surface parts if they are filled with the same pattern.

Other features and advantages of the present invention will be apparent from the following detailed description and the accompanying drawings of a presently preferred embodiment of the best mode of carrying out the invention.

DESCRIPTION OF THE PREFERRED EMBODIMENT

Figure 1:
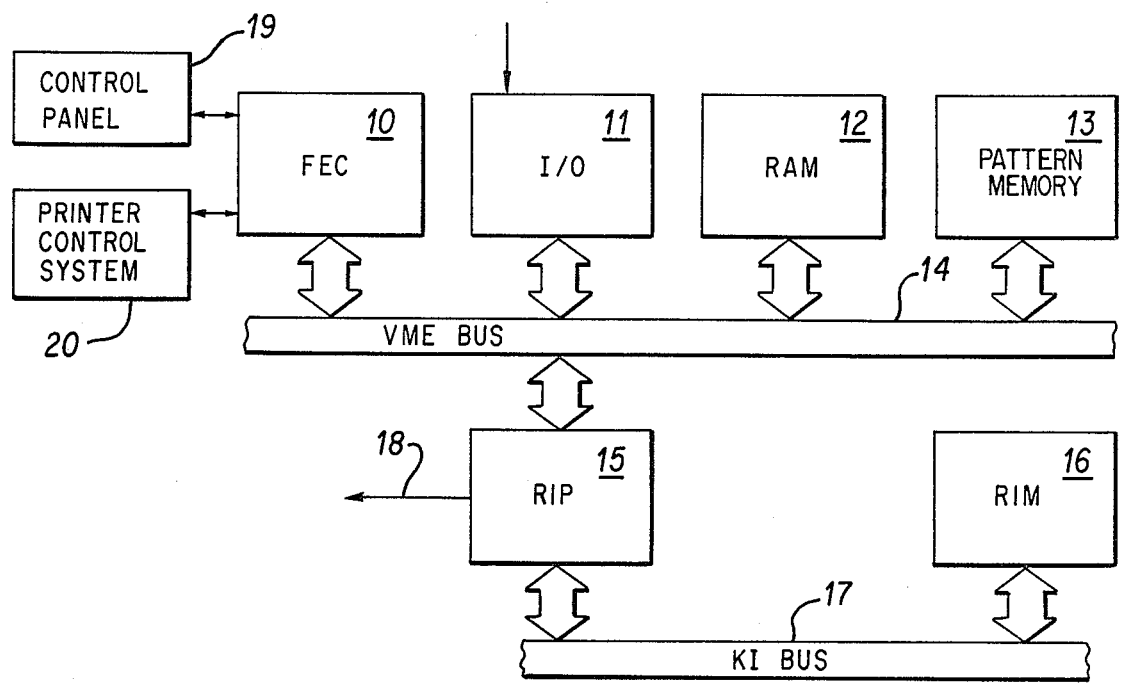
FIG. 1 is a diagrammatic representation of a front-end system for a laser printer which can utilize the method of the present invention.

FIG. 1 is a diagrammatic representation of a front-end system for a laser printer which can utilize the method of the present invention. A front-end controller 10 (FEC) is connected to a control panel 19 and to a laser printer control system 20. Front-end controller 10 contains a 16-bit microprocessor system with a Motorola 68000 microprocessor. This microprocessor system together with a local read only memory and a part of a freely programmable memory 12 (RAM) forms the front-end control. Bit-representations of typographic characters and basic patterns for the generation of surface patterns are stored in a pattern memory 13, which is preferably a read only memory.

An input/output (I/O) processor 11, which also contains a 16-bit microprocessor system with a Motorola 68000 processor, is used to connect the front-end system to a diskette memory, a work station, a computer or the like. Front-end controller 10, I/O processor 11, RAM 12, and pattern memory 13 are interconnected by means of a standard VME bus 14. Alternatively, pattern memory 13 can be constructed as a separate RAM or as a part of RAM 12, in which case the bit-representations of the letter characters or surface patterns are read from a hard-disk memory or floppy-disk memory into pattern memory 13.

A raster image processor 15 (RIP) is also connected to VME bus 14. Raster image processor 15 is also connected to a raster image memory 16 (RIM) by a raster image bus 17 (RIbus). Raster image processor 15 is used to fill raster image memory 16 with the required letter characters and basic surface patterns. It searches in pattern memory 13 for the required letter characters and basic surface patterns and reads them into raster image memory 16 at the required location. Raster image processor 15 can also read other graphic information out of RAM 12 and put it in raster image memory 16 at the required location. After raster image memory 16 has been filled, it can be read out through raster image processor 15 to a printer. Preferably, the readout information is fed to a modulator and then a laser printer in the form of a serial pixel-bit stream through bus 18.

The front-end system, including the raster image processor 15 are more particularly described in U.S. Pat. Application Ser. No. 912,588, filed Sept. 26, 1986, entitled "Front-End System" and U.S. Pat. Application Ser. No. 912,544, filed Sept. 26, 1986, entitled "Raster Image Processor," both of which are incorporated by reference as if fully set forth herein.

The image made on the laser printer photoconductor using this method consists of pixels of a size of about 0.05 mm ×0.05 mm. At this size, about 4000 ×6000 (i.e., 24,000,000) pixels are required for printing a page having an A4 size format. Accordingly, raster image memory 16 has a capacity of about 24 megabits or 3 megabytes. Preferably, the data transmission frequency of the video information from raster image memory 16 to the laser printer is about 25 megabits/s.

All the data necessary for the printing of a page is fed to RAM 12 via I/O processor 11, which is controlled by front-end controller 10. Raster image memory 16 is then filled by raster image processor 15 with the data stored in RAM 12. When this is done, the graphic elements from RAM 12 or pattern memory 13 are usually fed to raster image memory 16 first and then the letter characters are fed.

Raster image memory 16 is a dynamic memory and also contains a logic unit which at the user's option enables the data coming in via raster image bus 17 to be combined with the data already stored in raster image memory 16 through a logic operation. The logic operations are carried out per memory location (i.e., on the data in each memory location) and the result is again replaced at the corresponding memory location of raster image memory 16. This enables the present image information to be mixed with new image information in various ways called overlays.

Examples of different overlays and their corresponding logic function are given in the following table, in which ND denotes the new data and OD the old data:

| Overlays | Logic Function |
|---|---|
| WRITE | ND |
| PAINT | ND.OR.OD |
| MASK | ND.AND.OD |
| ERASE | ND.AND.OD |
| INVERT | ND |
| INV.PAINT | ND.EXOR.OD |
| NOP | OD |
| CLEAR | ZERO (logic 0) |
| SET | ONE (logic 1) |

Generally, the most common logic operations used in the generation of surface patterns are PAINT, ERASE and INV.PAINT.

FIGS. 2A to 2E represent a flow diagram of a preferred embodiment of the method of filling a rectangular surface part with a surface pattern. The basic idea of the method will first be explained by reference to the example illustrated in FIG. 3 and then the detailed steps will be explained with reference to FIGS. 2A through 2E. Although the surface part chosen is a rectangle, it is understood that the method can be applied to any shape of surface pattern.

Figure 2A:
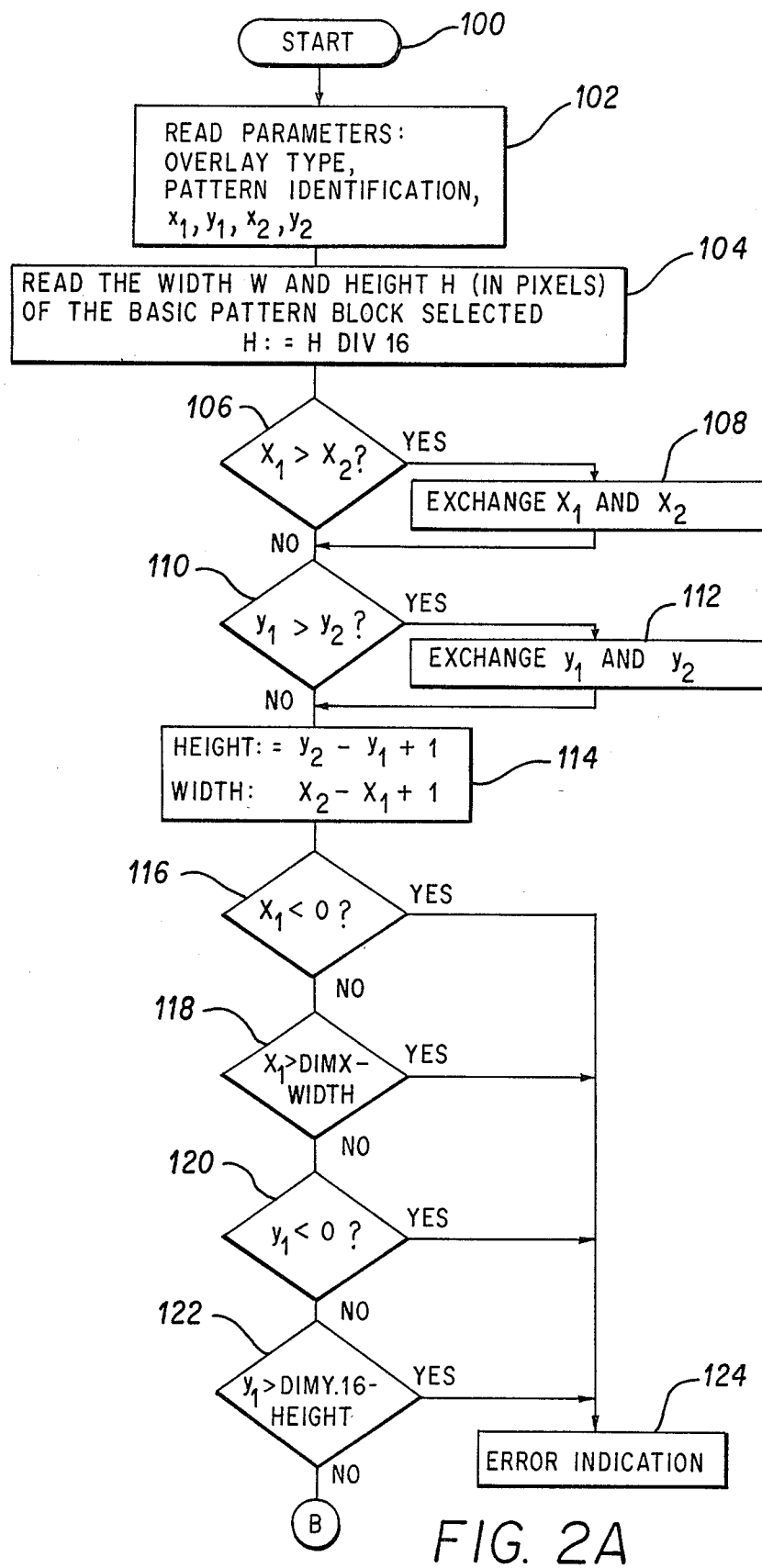
FIGS. 2A to 2E are flow diagrams showing a preferred embodiment of the method according to the present invention.
Figure 2B:
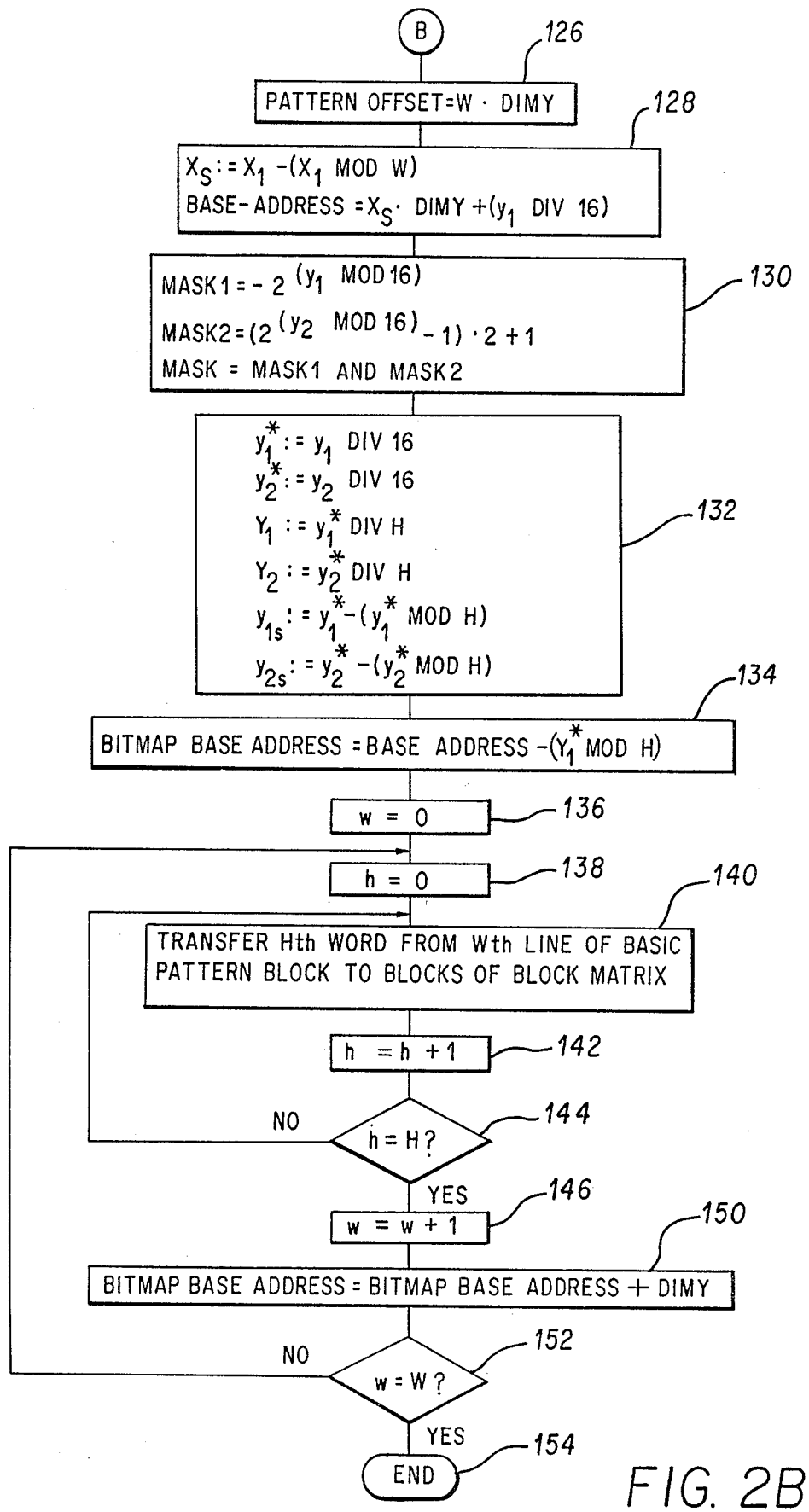
Figure 2C:
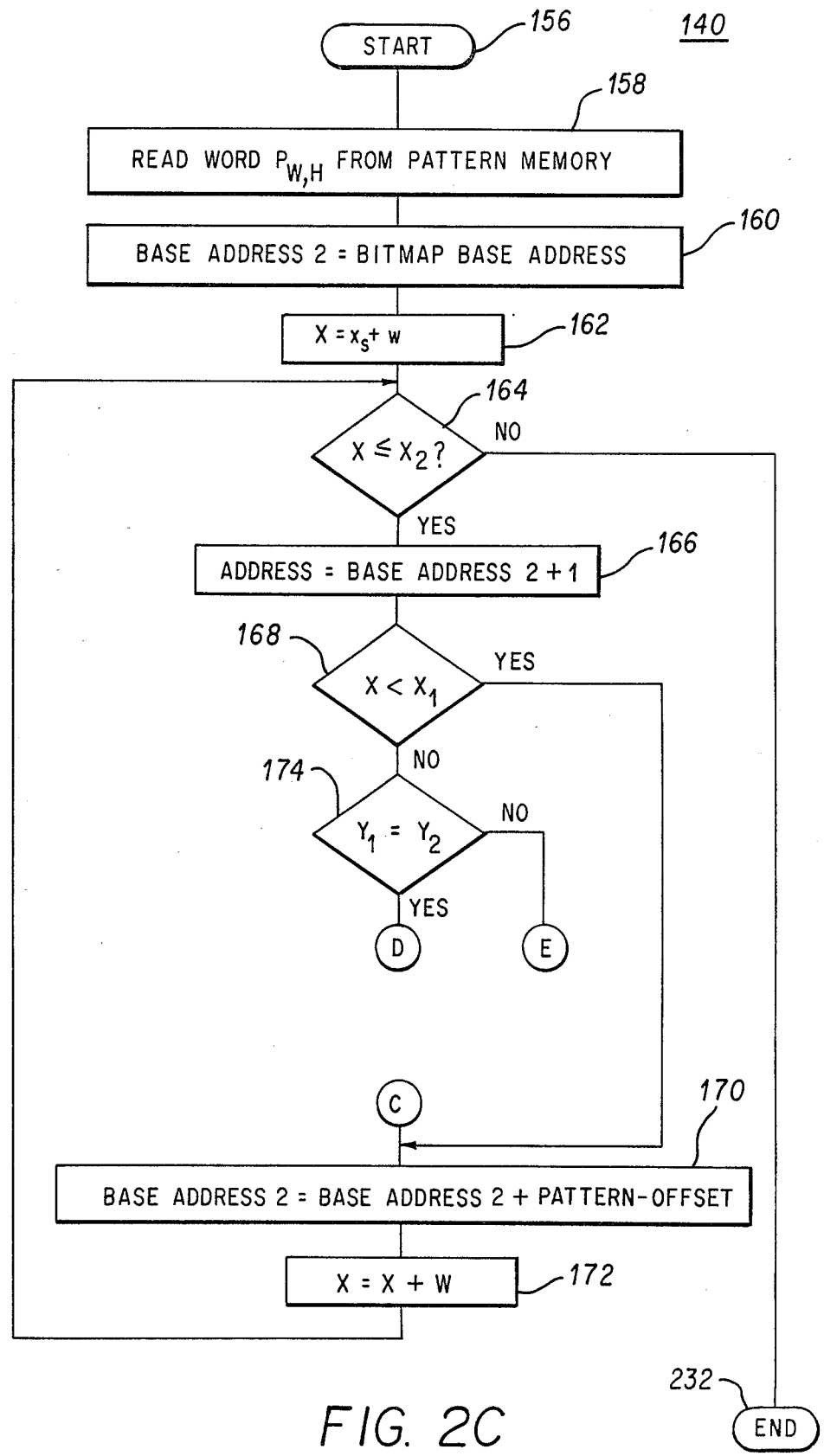
Figure 2D:
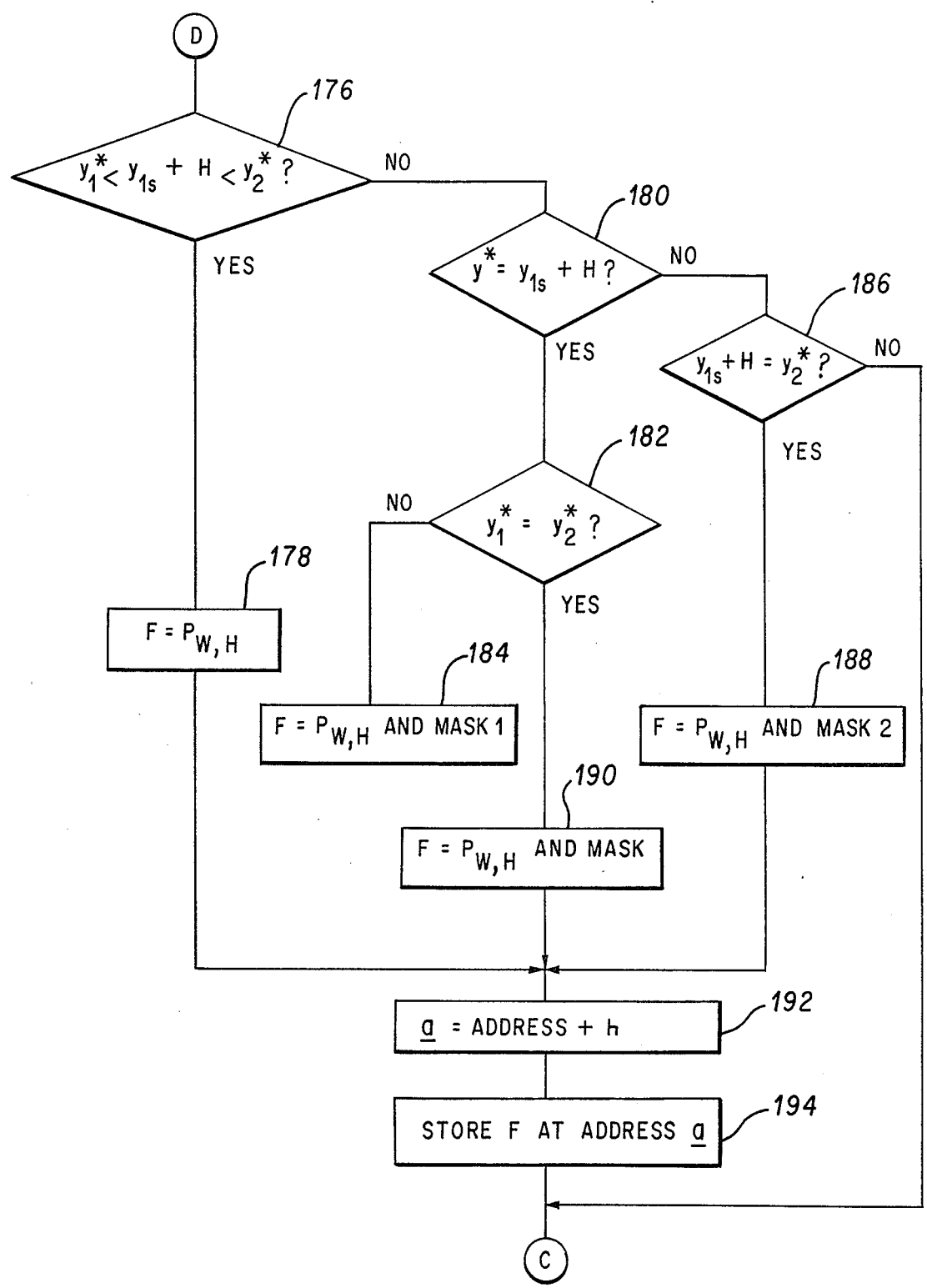
Figure 2E:
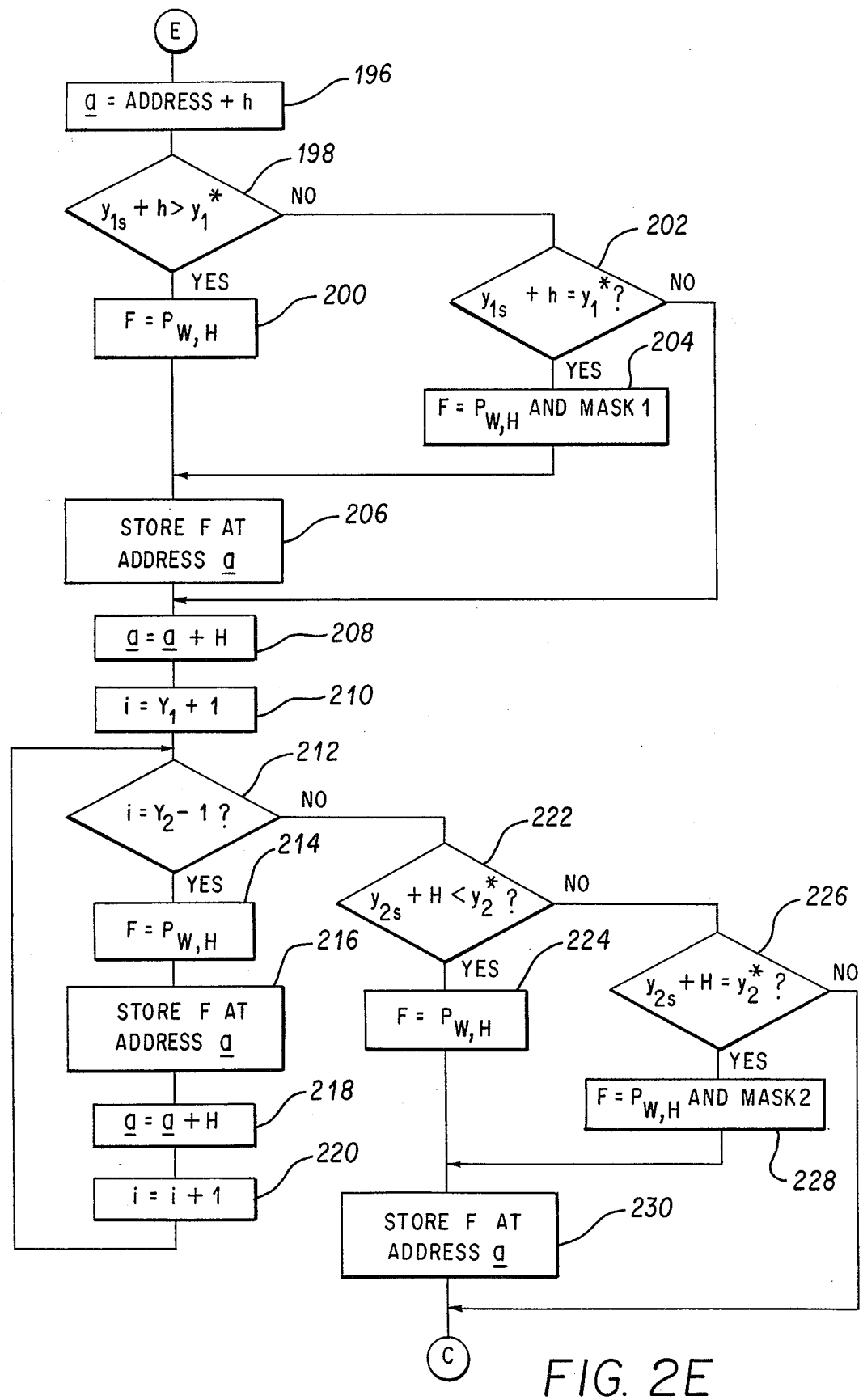
Figure 3:
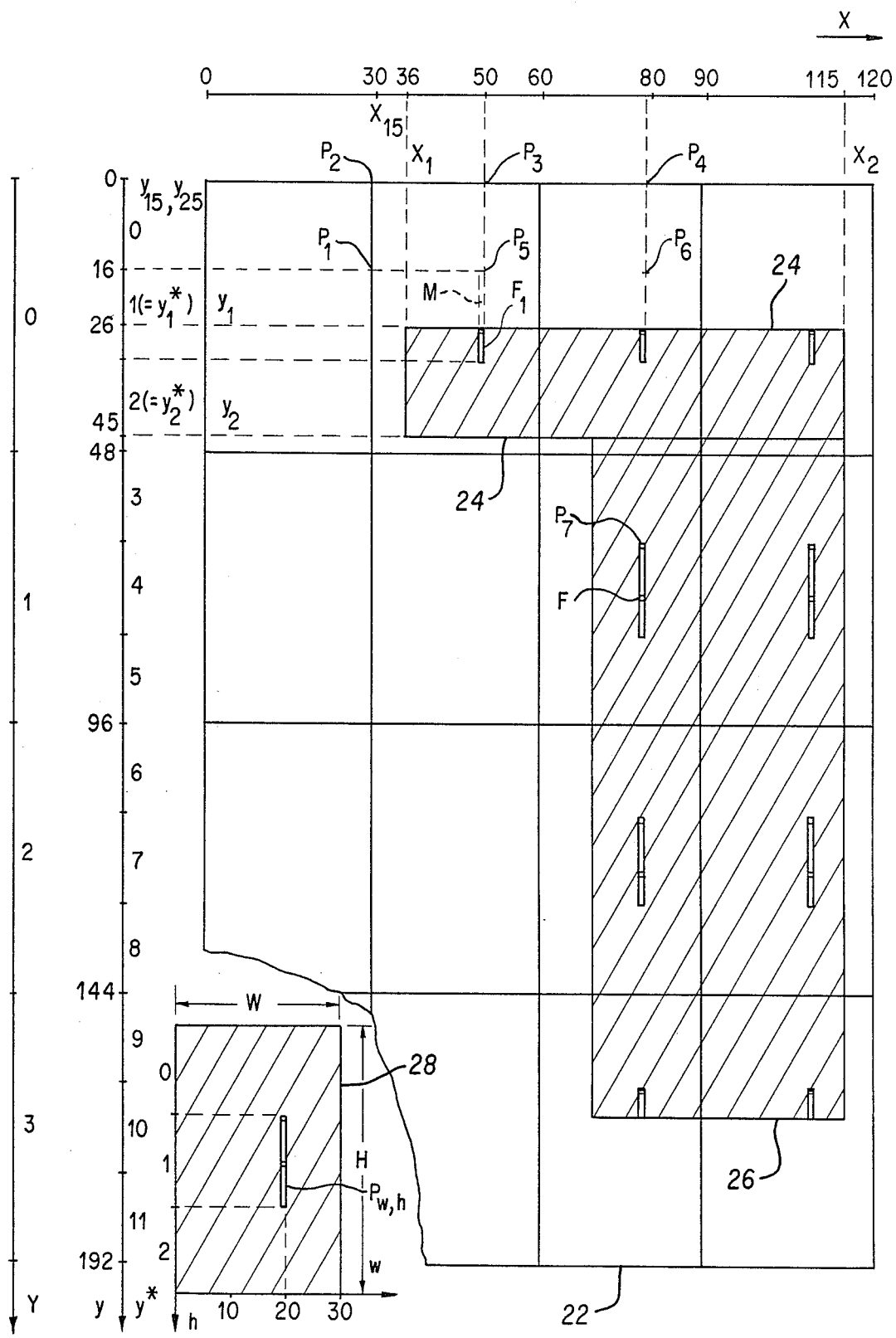
FIG. 3 is a diagram of a page wherein two surface parts are filled with a surface pattern using a preferred embodiment of the method according to the present invention.

FIG. 3 illustrates a page 22 which is to be printed. For the sake of clarity, however, FIG. 3 shows a coarser dot raster than is used in practice. The format of page 22 is 120 pixels in the x-direction and 192 pixels in the y-direction. Two adjacent rectangular surface parts 24 and 26 are to be filled with the surface pattern already indicated in FIG. 3 without the surface pattern shifting at the boundary between surface parts 24 and 26. This is accomplished by using the method illustrated in FIGS. 2A to 2E.

First, surface part 24 is filled and then the method of the present invention is used to fill surface part 26. The general approach for filling a single surface part is that first the entire surface of the page is filled with the surface pattern and then those areas which do not belong to the surface part are covered by means of a mask. By successively filling a large number of surface parts with the same pattern in this way, it is ensured that the pattern proceeds continuously at the boundaries between the surface parts. Additionally, where surface parts overlap, the surface patterns in these areas of overlap are situated exactly one upon the other, resulting in a continuous pattern on the printed page rather than a double image.

The bottom left hand corner of FIG. 3 shows a basic pattern block 28 which contains the pattern to be filled in or located in surface parts 24 and 26. The entire area of page 22 is subdivided into a matrix, preferably a 4×4 block matrix having 16 matrix elements. Each matrix element corresponds in size to basic pattern block 28. When 16 basic pattern blocks all corresponding to basic pattern block 28 are connected up in accordance with the block matrix, a continuous surface pattern is formed which fills the entire area of page 22.

To obtain the graphic information concerning the surface pattern it is only necessary to store the basic pattern of the relatively small basic pattern block 28 in the form of a bit-map in pattern memory 13 or in RAM 12. In the example illustrated in FIG. 3, basic pattern block 28 has a format of 30×48 pixels. Pattern memory 13 and raster image memory 16 are preferably constructed as word-oriented memories for 16-bit words. As such, every sixteen pixels in a row are combined to form one word and therefore the dimensions in the vertical direction in FIG. 3 are also indicated in words. Accordingly, basic pattern block 28 has a width W=30 pixels and a height H=3 words. This means that the entire page 22 has a width DIMX=120 pixels and a height DIMY=12 words.

Various basic patterns such as cross-hatching, dot gratings or line gratings, all of different thicknesses, spacings, or directions, are stored in pattern memory 13 or in RAM 12. In principle, any desired periodic surface pattern can be stored in this way. The various basic patterns may have different dimensions. The only limitation in the example described is that the height of the basic pattern block in pixels must be a multiple of 16 since the page is preferably divided up into words.

The operation of raster image processor 15 in the filling of surface part 24 with a surface pattern according to basic pattern block 28 will now be explained with reference to FIGS. 2A to 2E. After the start of the cycle in step 100 in FIG. 2A, some parameters which are determined by the user are read into the system via I-O processor 11 and VME bus 14. One of these parameters is the overlay which indicates by a specific code the logic operation to be performed by the logic unit of raster image memory 16. A basic pattern such as basic pattern 28 which is shown in FIG. 3 is present in pattern memory 13 and is selected by the user through a "pattern identification" variable. Surface part 24 is indicated by the coordinates $(x_1, y_1)$ and $(x_2, y_2)$ of two diagonally opposite corner points. Referring to FIG. 3, those coordinates have the following value (in pixels): $x_1=36$, $x_2=115$, $y_1=26$ and $y_2=45$.

The width W and the height H of basic pattern block 28 which has been selected using the "pattern identification" variable is read into the system in step 104. The height H indicated in pixels is divided by 16 so that the height H is obtained in words. In the example described and shown in FIG. 3, basic pattern block 28 has a width W=30 pixels and a height H=3 words.

If, with boundaries of the surface part as indicated, $x_1$ is greater than $x_2$, the values of $x_1$ and $x_2$ are exchanged as shown in steps 106 and 108. Similarly, the values of $y_1$ and $y_2$ are exchanged in steps 110 and 112 if $y_1$ is greater than $y_2$. This ensures that surface part 24 is defined by the top left corner point and by the bottom right corner point. In steps 114 through 124 a test is carried out to check whether the boundaries of the surface part lie within the format DIMX×DIMY of page 22. Since the pixels which form the boundaries of surface part 24 are also counted as belonging to the surface part, the difference between the coordinate values must be increased by 1 each time in the calculation of the height and the width of the surface part in step 114. If one of the boundaries of surface part 24 falls outside the page format, an error signal is generated in step 124.

A variable "pattern offset" is calculated in step 126 as shown in FIG. 2B. This variable indicates the value by which the address of the raster image memory must be increased when a jump is carried out over the width W of the basic pattern in the x-direction which in this example is 30 pixels. Since the addresses in raster image memory 16 are numbered column-wise, the addresses must be increased by DIMY (the number of words in a column) in the case of a jump over 1 pixel in the x-direction. A variable $x_s = x_1 - (x_1 \text{ MOD } W)$ is then calculated in step 128. The variable $x_s$ indicates the left hand boundary of the block matrix which contains the point $(x_1, y_1)$. MOD is a function which subtracts the highest multiple of the operand which will still give a positive number. In the example illustrated, $x_s = 36 - (36 \text{ MOD } 30) = 36 - 6 = 30$. The base address value is then calculated according to base address $= x_s \cdot \text{DIMY} + y_1 \text{ DIV } 16$. DIV denotes a division followed by the formation of a whole number of the quotient. Thus $y_1 \text{ DIV } 16 = 26 \text{ DIV } 16 = 1$. The base address value is a provisional value for the addresses in raster image memory 16. The corresponding point of page 22 is denoted by $P_1 (30, 16)$ as shown in FIG. 3.

The mask functions Mask1, Mask2 and Mask are calculated in step 130. These mask functions serve to suppress the surface pattern outside surface part 24. In the case of a rectangular surface part the mask functions need to be defined only on words which contain the top and bottom boundaries respectively of the surface part. In the example illustrated $y_1 \text{ MOD } 16 = 26 \text{ MOD } 16 = 26 - 16 = 10$. Mask1, therefore, is a 16-bit word which in the first ten binary places contain only zeroes and in the other six binary places contain only ones. When Mask1 is placed, for example, on position M in the raster image memory in accordance with the word division of raster image memory 16, all the zeroes are situated outside surface part 24 and the associated ones are situated within surface part 24.

Mask2 is the corresponding mask function for the bottom boundary of surface part 24. In the example illustrated, $y_2 \text{ MOD } 16 = 45 \text{ MOD } 16 = 45 - 32 = 13$. Mask2 therefore, is a 16-bit word, in which the first 13 binary places contain the value 1 and the last 3 binary places contain the value 0.

To form the function Mask, Mask1 and Mask2 are combined per element by a logic AND operation. The corresponding 16-bit word, in the above example if Mask1 and Mask2 were combined, would have the value 0 at the binary places 1 to 10, the value 1 at the places 11 to 13, and the value 0 at the places 14 to 16. The Mask function is required when the top and bottom boundaries of the surface part lie within the same word.

Some conversions of the y-coordinates are carried out in step 132. The values $y_1^*$ and $y_2^*$ respectively denote the top and bottom boundaries of surface part 24 in words rather than in pixels. In FIG. 3, $y_1^* = 1$ and $y_2^* = 2$. The values $Y_1$ and $Y_2$ indicate in which line of the block matrix, respectively, the top and bottom boundaries of the surface part lie. They are calculated as follows: $Y_1 = y_1^* \text{ DIV } H$ and $Y_2 = y_2^* \text{ DIV } H$. In FIG. 3, the entire area of surface part 24 lies in the top line of the block matrix, which means that $Y_1 = Y_2 = 0$. The values $y_{1s}$ and $y_{2s}$ indicate in words those y-coordinates of the top boundary of the block matrix line which contains the top and bottom boundaries respectively of surface part 24. They are calculated as follows: $y_{1s}=y_1^*-(y_1^* \text{ MOD } H)$ and $y_{2s}=y_2^*-(y_2^* \text{ MOD } H)$. In FIG. 3, $y_{1s}=y_{2s}=0$.

In step 134 shown in FIG. 2B, a base address of the raster image memory 16 known as the bitmap base address is calculated using the formula bitmap base address =base address $-(y_1^* \text{ MOD } H)$. The corresponding point of page 22 is denoted by $P_2$ (30,0) in FIG. 3 and lies in the top left hand corner of the block matrix which contains the point ($x_1$, $y_1$).

Steps 136 to 152 form two loops, one running through the other, in which the words of basic pattern block 28 which are stored in pattern memory 16 are scanned column-wise and line-wise and are read into raster image memory 16. The inner loop formed by steps 140 to 144 correspond to the scanning of a line of height H of basic pattern block 28 from top to bottom. The essential step 140 of this loop contains a subprogram by means of which a 16-bit word $P_{w,h}$ having a column index w and a line index h is called up from pattern memory 16 and possibly after a logic operation with a mask function, is imaged on all those blocks of the block matrix at which at least a part of the word called up lies within surface part 24. The special features of this subprogram will be explained later in more detail with reference to FIGS. 2C through 2E.

After a column of basic pattern block 28 has been fully scanned, the bitmap base address is increased by DIMY in step 150. This corresponds to shifting the point $P_2$ by one pixel in the x-direction. The loop 138 to 152 is then traversed again to scan the next column of basic pattern block 28 until the entire width W has been scanned. When all the columns have been scanned, the surface part is completely filled with the surface pattern of basic pattern 28 and the method is terminated at step 154.

The subprogram shown in step 140 starts with step 156 as shown in FIG. 2C. The words $P_{w,h}$ of basic pattern block 28 are read serially from pattern memory 13 via VME bus 14. During this operation, the columns of the basic pattern block, starting with the column on the extreme left, are scanned successively from top to bottom. The word read at step 158 in subprogram 140 has precisely those column and line indices w and h which were previously set in steps 142 and 146. In the example shown in FIG. 3, it is assumed that it is precisely the word $P_{20,1}$ of basic pattern 28 that is read. In step 160 a variable address called base-address2 is introduced and then made equal to the bitmap base address. For w=20, bitmap base address corresponds to the point $P_3$ (50,0) in FIG. 3 because of the stepwise increase which occurs in step 150.

In step 162 a parameter X is defined which equals $x_s+w$ and indicates in pixels which column of page 22 is being processed. In FIG. 3, the value of the parameter X is first equal to $x_s+w=30+20=50$. As long as X is smaller than or equal to the right hand boundary $x_2$ of surface part 24, (as determined by step 164), a further variable called address is defined in step 166 and made equal to base address2 +1 because the addresses and data are transferred successively via raster image bus 17 which is not shown in FIG. 3.

If the parameter X is less than the left hand boundary $x_1$ of surface part 24 as determined by step 168, the corresponding word cannot yet be placed in surface part 24. In the example shown in FIG. 3 this occurs when w is between 1 and 5. In that case, as shown in step 170 base address2 is increased by the value of the pattern-offset (i.e., the jump from $P_3$ to $P_4$ in FIG. 3) and the parameter X is increased in step 172 by the width W of basic pattern block 28 (in this case from 50 to 80). The loop is then repeated starting with step 164.

For the case w=20, the comparison in step 168 shows that X is greater than or equal to $x_1$. In that case the word $P_{20,1}$ is introduced into the column X=50 at all permissible places. To this end, in step 174 a decision is first taken whether surface part 24 lies within a single line of the block matrix (i.e., $Y_1=Y_2$). In the case of surface part 24, $Y_1=Y_2=0$. As a result, step 176 in FIG. 2D is carried out as the next step. In this step, a check is made whether the image of the word $P_{w,h}$ in the block of page 22 indicated by $y_{1s}$ lies completely in the area of surface part 24. If this condition is satisfied, the word $P_{w,h}$ does not need to be modified by one of the mask functions, and the filling pattern word F which is read into raster image memory 16 in step 178 corresponds to the word $P_{w,h}$.

If the comparison in step 176 is not satisfied, a comparison is made in step 180 to see whether the image of the word $P_{w,h}$ lies at the top boundary $y_1^*$ of surface part 24. If this is the case, as in the example illustrated, a check is made in step 182 to determine whether the top or bottom boundary respectively of surface part 24 lies within the same word zone (i.e., does $y_1^*=y_2^*$). This is not the case in the example illustrated. The image $F_1$ of the word $P_{w,h}$ intersects only the top boundary of surface part 24 and therefore undergoes an AND operation with the mask function Mask1 in step 184. As a result, the areas situated above surface part 24 are excluded from the image and the modified filling pattern word $F_1$ is read into raster image memory 16.

If step 180 shows that the image of the word does not lie on the top boundary of surface part 24, a check is made in step 186 to determine whether the image lies on the bottom boundary of surface part 24. If that is the case, the word $P_{w,h}$ is modified in step 188 by means of an AND operation with Mask2 to ensure the areas situated below surface part 24 are excluded from the image and the modified filling pattern word $F_1$ is read into raster image memory 16. In the only other case, where the image of the word is not covered by surface part 24 at all, no pattern is read in and base address 2 is updated in step 170 as shown in FIG. 2C.

If comparison in step 182 shows that the image of the word intersects both the top boundary $y_1$ and the bottom boundary $y_2$ of surface part 24, the filling pattern word F is generated in step 190 by omitting the top and bottom boundary respectively at the word $P_{w,h}$ by means of the mask function Mask.

After the filling pattern F for the block in question has been defined in one of the steps 178, 184, 188 or 190, the end address a =address +h for raster image memory 16 is determined in step 192. This address corresponds to point $P_5$ (50,16) in FIG. 3. The filling pattern word F is set aside in raster image memory 16 at address via raster image bus 17 in step 194. Thereafter, step 170 is again executed with the next column of the block matrix.

If step 174 in FIG. 2C shows that the surface part to be filled extends over several matrix lines of the block matrix, the procedure illustrated in FIG. 2E is carried out. This procedure will be explained by reference to the word $P_{20,1}$ and surface part 26 in FIG. 3. It is assumed that the variable called address in step 166 has a value corresponding to point P₄ (80,0) in FIG. 3. This means that the first block to be processed is the one containing the top left hand corner of surface part 26.

In step 196 address a is made equal to the value address +h which corresponds to point P₆ (80,16). If the image of the word $P_{w,h}$ (with a y-coordinate of $y_{1s}+h$) lies fully within surface part 26 as determined in step 198, the word $P_{w,h}$ is taken as the filling pattern word F in step 200. If the image of the word intersects the top boundary of surface part 26 as determined in step 202, then the word $P_{w,h}$ is modified with Mask1 in step 204. The filling pattern word F determined in step 200 or 204 is stored at address a in step 206. If it appears in step 202 that the image of the word lies completely outside surface part 26 (i.e., above the top boundary in this example), the word cannot be set aside in that block. Following step 206 or 202, the next block in the relevant column of the block matrix is processed. Address is increased in step 208 with a value corresponding to the height H of basic pattern block 28.

Address a now points to point P₇ (80,64). The value Y₁ indicates the line of the block matrix of page 22 which contains the top boundary of surface part 26 and in the example illustrated has the value 0. The value Y₂ indicates the matrix line which contains the bottom boundary of surface part 26, and in the example has the value 3. In the case of the blocks in matrix lines 1 and 2, the image of the word $P_{w,h}$ in each case lies within the area of surface part 26. These blocks are processed successively in a loop formed by steps 212 to 220. For this purpose, an index i is defined in step 210 which after each run-through of the loop is increased in step 220 until it reaches the value Y₂−1 which is checked in step 212. On each run-through of the loop the filling pattern word $F=P_{w,h}$ is placed in the relevant block in steps 214 and 216, and then in step 218 address a is changed to the corresponding address in the block therebeneath.

After the loop has been completely processed, the block containing the bottom boundary of surface part 26 is processed starting with step 222. Steps 222 to 230 are similar to steps 198 to 206 for the block containing the top boundary of the surface part. After the entire column of the block matrix has been processed, the next column of the block matrix is filled beginning with step 170 as shown in FIG. 2C. If step 164 shows that the column X in which the image of the word $P_{w,h}$ is to be placed lies outside x₂ it means that a filling pattern word F corresponding to the word $P_{w,h}$ was placed in all the permissible places of the surface part and the subprogram terminates with step 232.

When surface parts 24 and 26 have been 25 successively filled with the surface pattern by the previously described method, a uniform surface pattern is formed which extends over the two surface parts 24 and 26 as can be seen in FIG. 3. This is achieved by defining a uniform surface pattern over the entire area of page 22 using basic pattern block 28 and the block matrix division of page 22.

To save processing time and memory, the surface pattern is not really generated over the entire area of page 22. The surface pattern is generated only in those matrix blocks of page 22 which are overlapped by the surface part to be filled. The exact position of the surface pattern is not defined by the boundaries of the surface part to be filled, but by the block boundaries.

With the above-described method, the relevant part of the block matrix is scanned for each word $P_{w,h}$ which is called up from pattern memory 13 and is deposited at all permissible places. This has the advantage that the time consuming process of reading a word out of pattern memory 13 via VME bus 14 is necessary only rarely, namely only once for each word of basic pattern block 28. If the reverse way were taken and if the corresponding word were called up from pattern memory 13 for each word lying in the surface part to be filled, then the processing time required to fill the blocks would be determined by the read-in time T(VME) of VME bus 14. The processing time for a surface part having a width x and a height y (the height in words) would then be:

$$T1 = xy[T(VME)] \quad (1)$$

With the method of the present invention, the required processing time can be calculated as follows:

$$T2 = WH\left[ T(VME) + \frac{x}{W} T(SCAN) + \frac{xy}{WH} T(RIBus) \right] \quad (2)$$

Where T(RIBus) denotes the cycle time of raster image bus 17 and T(SCAN) denotes the processing time required for the changeover from one column of the block matrix to the next column.

Raster image processor 15 utilizes an address sequencer such as the 2910A made by Advanced Micro Devices. The address sequencer is used in the loop consisting of steps 212 to 220 in FIG. 2E, for filling in all the blocks in the same column of the block matrix and can be completed very quickly. The blocks in one column can be processed within the cycle time of raster image bus 17 so that no extra computing time is necessary for these steps. Since the cycle time T(RIBus) of raster image bus 17 is usually considerably less than the cycle time T(VME) of VME bus 14, the method of the present invention gives a considerable saving in time.

In a practical front-end system, T(VME) is about 1 μ sec. while T(RIBus) and T(SCAN) are about 0.4 μ sec. Consequently:

$$\frac{T2}{T1} = \frac{WH}{xy} + \frac{H}{y}(0.4) + 0.4 \quad (3)$$

Figure 4:
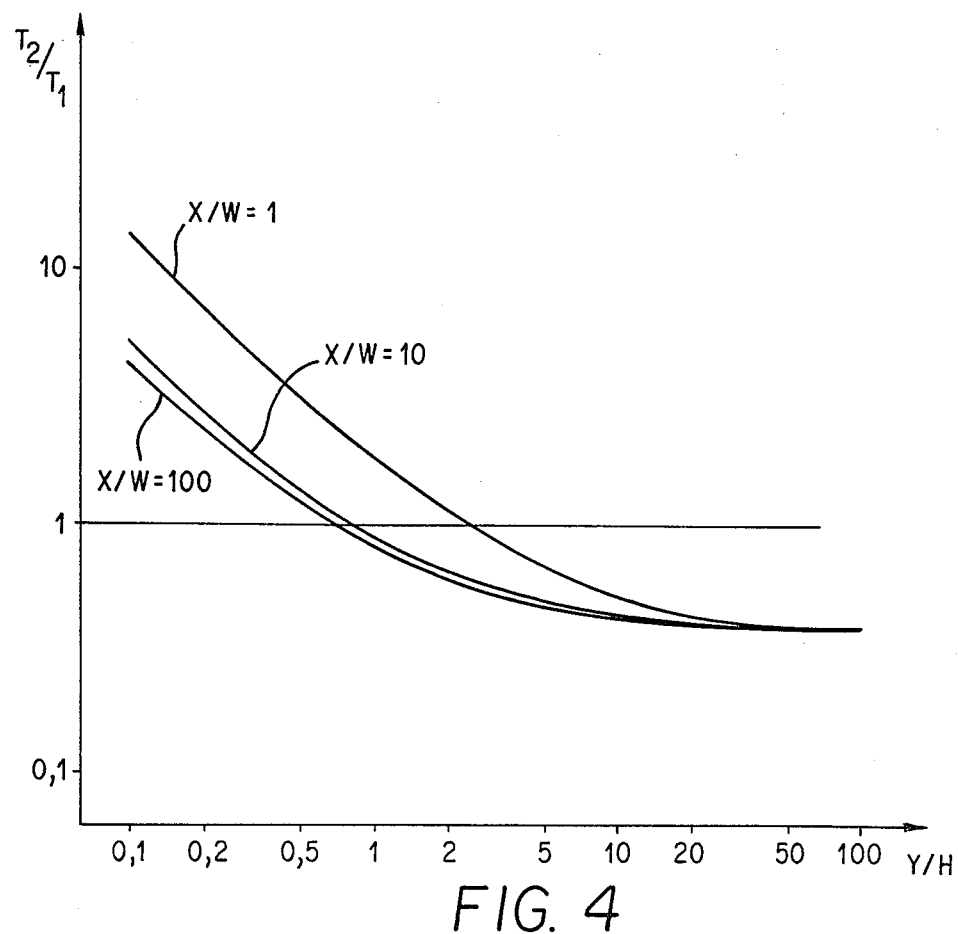
FIG. 4 is a graph for comparing processing times for different ratios of the dimensions of the pattern block to the dimensions of the surface part to be filled.

The ratio T2/T1 is represented graphically in FIG. 4 for various values of W/x. T2 is smaller than T1 if the height y of the surface part to be filled is at least 0.5 to 2 times the height H of the basic pattern block. A normal basic pattern block has a width of 6 pixels and a height of 48 pixels (3 words) which corresponds to a height of about 2.4 mm. In nearly all practical cases the height of the surface part to be filled is much greater than the height of the basic pattern block so that using the method of the present invention has advantages including a shorter processing time.

The invention is not limited to the embodiment described herein. Using an equivalent method it is possible, for example, to fill surface parts which are not rectangular. One skilled in the art can make various modifications to the preferred embodiment described with particularity herein which will be within the scope of the following claims.

What is claimed is:

1. A method used by a raster image processor for filling with a surface pattern a surface part of an image stored in the form of a bit-representation in a raster image memory comprising the steps of:

(a) generating a bit-representation of a surface pattern defined uniformly over an entire image surface;

(b) generating an appropriate mask function which produces a first logic value for those raster points which are situated within the surface part and a second logic value for those raster points which are situated outside thereof;

(c) performing a logic operation which combines the bit-representation of the surface pattern and the appropriate mask function to generate a filling pattern; and (d) transferring the filling pattern to the raster image memory by combining the filling pattern with any existing contents of the raster image memory using a user selected operation.

2. A method as described in claim 1 wherein the surface pattern is periodic in at least one dimension such that the bit-representation of the surface pattern can be generated using a bit-representation of a periodically recurring basic pattern block which is stored in a pattern memory; wherein generating the bit-representation of the surface pattern further comprises dividing the image into a block matrix such that a matrix element corresponds in size of the basic pattern block, and scanning the block matrix line-wise or column-wise with the basic pattern block.

3. A method as described in claim 2 wherein the pattern memory and the raster image memory are word-oriented memories and the step of generating a bit-representation of a surface pattern comprises calling up a word stored in the pattern memory only once and imaging it line-wise or column-wise on the block matrix.

4. A method as described in claim 3 wherein a word of the basic pattern block is imaged only on blocks of the block matrix which have at least one raster point in common with the surface part to be filled.

5. A method as described in claim 4 wherein a filling pattern is generated for each word of the basic pattern memory and for each block of the block matrix containing part of the surface part, such that each basic pattern word is logically combined with the appropriate mask function to generate a filling pattern word when the basic pattern word lies partially within and partially outside the surface part to be filled, and said basic pattern word becomes the filling pattern word when the basic pattern word lies fully within the surface part.

6. A method as described in claim 5 wherein the surface parts to be filled are rectangular, the surface parts and the basic pattern block are oriented in the x and y direction with the words and the columns of the block matrix extending in the y-direction, the step of generating a filling pattern further comprising the step of checking to determine, for each basic pattern word and for the individual columns of the block matrix, whether the basic pattern word in the blocks of each column lies below the surface part or above the surface part and if so, proceeding with the next column of the block matrix or with the next basic pattern word, respectively.

7. A method as described in claim 2 wherein the pattern memory and the raster image memory are word-oriented memories and the step of generating a bit-representation of a surface pattern comprises calling up a word stored in the pattern memory only once and imaging it line-wise or column-wise on the block matrix.

8. A method as described in claim 7 wherein a word of the basic pattern block is imaged only on blocks of the block matrix which have at least one raster point in common with the surface part to be filled.

9. A method as described in claim 8 wherein a filling pattern is generated for each word of the basic pattern memory and for each block of the block matrix containing part of the surface part, such that each basic pattern word is logically combined with the appropriate mask function to generate a filling pattern word when the basic pattern word lies partially within and partially outside the surface part to be filled, and said basic pattern word becomes the filling pattern word when the basic pattern word lies fully within the surface part.

10. A method as described in claim 9 wherein the surface parts to be filled are rectangular, the surface parts and the basic pattern block are oriented in the x and y direction with the words and the columns of the block matrix extending in the y-direction, the step of generating a filling pattern further comprising the step of checking to determine, for each basic pattern word and for the individual columns of the block matrix, whether the basic pattern word in the blocks of each column lies below the surface part or above the surface part and if so, proceeding with the next column of the block matrix or with the next basic pattern word, respectively.

11. A device for filling with a surface pattern a surface part of an image stored in the form of a bit-representation comprising:

a front end-controller for controlling a front-end system;

an I/O processor connected to a computer or to a data network;

at least one memory for storing data supplied by the I/O processor for a page to be assembled wherein a portion thereof comprises a pattern memory for storing the bit-representations of the typographic characters and basic patterns for generating the surface pattern used to fill the surface part;

a raster image memory for storing the bit-representation of a complete page to be printer;

a raster image processor for expanding the data for a page to be assembled, directing the bit-representation thereof in the raster image memory and combining it with the bit-representation of the basic pattern to form a resulting bit-representation, and for converting the resulting bit-representation into a serial pixel-bit stream for supply to a raster output scanner;

a first bus system for connecting together the front-end controller, the I/O processor, the memory and the raster image processor; and a second bus system for connecting the raster image processor to the raster image memory.

* * * * *